United States Patent
Bush et al.

(10) Patent No.: US 7,605,942 B2
(45) Date of Patent: Oct. 20, 2009

(54) METHOD AND APPARATUS FOR CREATING PRINTED DOCUMENTS AND INTERNET WEB PAGES

(75) Inventors: Eric F. Bush, Centreville, VA (US); James Lewandowski, Potomac Falls, VA (US); Daniel Hertz, Peoria, AZ (US); Libby Dollison, Oakton, VA (US); Caryn A. Allen, Great Falls, VA (US)

(73) Assignee: Sallie Mae, Inc., Reston, VA (US)

( * ) Notice: Subject to any disclaimer, the term of this patent is extended or adjusted under 35 U.S.C. 154(b) by 669 days.

(21) Appl. No.: 11/172,919

(22) Filed: Jul. 5, 2005

(65) Prior Publication Data

US 2006/0112324 A1    May 25, 2006

Related U.S. Application Data

(60) Provisional application No. 60/585,926, filed on Jul. 8, 2004.

(51) Int. Cl.
*G06F 15/00* (2006.01)
*G06F 3/00* (2006.01)

(52) U.S. Cl. ...................................... 358/1.18; 715/744

(58) Field of Classification Search ................ 358/1.18, 358/1.15, 1.14, 1.13; 715/205, 234, 243, 715/700, 744; 705/1, 6, 9, 39–40; 709/222–223, 709/206, 248

See application file for complete search history.

(56) References Cited

U.S. PATENT DOCUMENTS

| | | | |
|---|---|---|---|
| 6,529,214 B1 * | 3/2003 | Chase et al. ................. | 715/744 |
| 2001/0032178 A1 | 10/2001 | Adams et al. | |
| 2002/0048037 A1 | 4/2002 | Carbone | |
| 2002/0129061 A1 | 9/2002 | Swart et al. | |
| 2002/0147652 A1 | 10/2002 | Gheith et al. | |
| 2003/0055871 A1 | 3/2003 | Roses | |
| 2003/0208397 A1 * | 11/2003 | VanDusen .................... | 705/14 |

* cited by examiner

*Primary Examiner*—Saeid Ebrahimi Dehkordy
(74) *Attorney, Agent, or Firm*—Dickstein Shapiro LLP

(57) ABSTRACT

Embodiments of the invention provide a system, computer program product and method for creating printed documents and Web pages. A user interface is provided. Through the user interface a first user can select from among a plurality of document templates; complete each of the selected document templates simultaneously, and view the completed document templates.

19 Claims, 24 Drawing Sheets

SallieMae cart | view saved orders(0) | my profile | help | sign out

| home | place order | order status | library | create content |

Welcome to the Digital Publishing Gateway

The Digital Publishing Gateway allows you to quickly order collateral, create custom sales kits and track the delivery of your orders to your clients or events.

Welcome Eric

You have 0 saved orders

MOST RECENT PENDING ORDERS

| DATE | SCHOOL/EVENT | ORDER # |

COMPLETED ORDERS

| DATE | SCHOOL/EVENT | ORDER # | help | terms of use | privacy policy | contact us

SallieMae cart | view saved orders(1) | my profile | help | sign out

[ home ] [ place order ] [ order status ] [ library ] [ create content ]

Ordering is easy
Simply choose the category you would like to order and complete the steps presented.

Place order

Click on of the categories below to start your order.

General collateral　　　　　　　　　　　　　　　[ ORDER ]

Place an order for general collateral materials.

Custom sales kits　　　　　　　　　　　　　　　[ ORDER ]

Custom Sales Kits allows you to create a customized cover letter, select product sell sheets and other materials, indicate collation instructions, and include your business card into a folder for delivery to your client.

Custom Print Brochures and Web Pages　　　[ ORDER ]

Create customized content for printed brochures and Web Pages simultaneously

SallieMae cart | view saved orders(1) | my profile | help | sign out

[ home ] [ place order ] [ order status ] [ library ] [ create content ]

Place order

1| Select Category
   o General Collateral

2| Choose School /
   Event / Myself

3| Choose Product

4| Order Checkout

5| Confirm Order

I would like to place an order for:

| | |
|---|---|
| College/university | [ORDER] |
| Conference/event | [ORDER] |
| Myself | [ORDER] |
| High school | [ORDER] | help | terms of use | privacy policy | contact us

SallieMae cart | view saved orders(1) | my profile | help | sign out

[ home ] [ place order ] [ order status ] [ library ] [ create content ]

Place order

1| Select Category
  o General Collateral

2| Choose School /
   Event / Myself

3| Choose Product

4| Order Checkout

5| Confirm Order

Choose the school for which you would like to place an order.

Complete any of the fields below to obtain school search results.

School code:
——————OR——————

School name:
——————OR——————

State:    -Select-

Ba help | terms of use | privacy policy | contact us

SallieMae cart | view saved orders(1) | my profile | help | sign out

[ home ] [ place order ] [ order status ] [ library ] [ create content ]

Place order

1| Select Category
   o General Collateral

2| Choose School /
   Event / Myself

3| Choose Product

4| Order Checkout

5| Confirm Order

402

Search results

Click on the school for which you wish to order. If your school isn't listed, search again add a new school.

| SCHOOL SEARCH RESULTS: 300 SCHOOLS | | |
|---|---|---|
| <<< | 11 | 12 | 13 | 14 | 15 | 16 | 17 | 18 | 19 | [20] | | | |
| CHOOSE SCHOOL | CITY | STATE SC |
| o University of Maryland- Baltimore | Baltimore | Maryland |
| o University of Maryland- Baltimore County | Baltimore | Maryland |
| o University of Maryland- College Park | College Park | Maryland |
| o University of Maryland- Eastern Shore | Princess Anne | Maryland |
| o University of Maryland- University College | College Park | Maryland |
| o Villa Julie College | Stevenson | Maryland |
| o Washington Bible College- Capital Bible Seminary | Lanham | Maryland |
| o Washington College | Chestertown | Maryland |
| o Washington School of Photography | Bethesda | Maryland |
| o Washington Theological Union | Silver Spring | Maryland |
| o WEST NOTTINGHAM ACADEMY | COLORA | Maryland |
| o Wor-wic Community College | Salisbury | Maryland |
| o WORLD TECHNOLOGY EDUCATION | Bethesda | Maryland |
| o YESHIVA OF GREATER WASHINGTON | SILVER SPRING | Maryland |
| o YESHIVA OF GREATER WASHINGTON | SILVER SPRING | Maryland |
| SCHOOL SEARCH RESULTS: 300 SCHOOLS | | |
| <<< | 11 | 12 | 13 | 14 | 15 | 16 | 17 | 18 | 19 | [20] | | | |

*FIG. 4F*

SallieMae cart | view saved orders(1) | my profile | help | sign out

[ home ] [ place order ] [ order status ] [ library ] [ create content ]

Place order

1| Select Category
  o General Collateral

2| Choose School /
   Event / Myself

3| Choose Product

4| Order Checkout

5| Confirm Order

404

Verify school information

Please verify school information we have on file. To edit or replace the current co information select the "edit" link. To add and additional cantact select the "New conta button.

School and Contact Information

Contact name:    Ms. Sarah Smith
Bauder edit      [ New contact ] [ Conta ]
Title:    Associate Director of Financial Aid - Lo Office name:

College name:

School name:    Socrates State University

Campus location:

Address:

Address 2:

City, state, zip:

Phone:

Fax:

Email address:

[ Back ] [ Ne ]

help | terms of use | privacy policy | contact us

*FIG. 4G*

SallieMae cart | view saved orders(0) | my profile | help | sign out

| home | place order | order status | library | create content |

DPG Product Library Search products

To find a product, enter the desired search criteria and click on 'Go'

Find the product(s) you would like to order by choosing one of the following options:

Search by keywords:
Type in keywords:

Select a product type:
Select a product type: [ Loan Products ▽ ]

Select by audience:
Select an audience: [ All audiences ▽ ]

Select by brand:
Select a product brand: [ All brands ▽ ]

Search by item number:
Enter your items numbers (separate multiple items with a comma).

View all products (alphabetic sort by product name)

405

Ba help | terms of use | privacy policy | contact us

*FIG. 4H*

| cart | view saved orders(2) | my profile | help | sign out |

[ home ] [ place order ] [ order status ] [ library ] [ create content ]

DPG Product Library  Choose a product

To find a product, enter the desired search criteria and click on 'Go'

Please select the item(s) and quantity of each you would like to order. If your item isn search again.

| PRODUCT SEARCH RESULTS: 53 PRODUCTS |||
| --- | --- | --- |
| \| [1] \| 2 \| 3 \| 4 \| >>> |||
| PREVIEW PRODUCT NAME / DESCRIPTION | ITEM # | PKG    P |
| Preview "What You Should Know About Credit Scores" Buckslips for HBCU Schools. PK/100 | BOR-056 | PK/100  \| 0 |
| Preview 001 Dollar Bank version of the MBA LOANS AY05-06 Brochures. Standard Pricing Tier. Zero Origination Fee on the Stafford Loan and Zero Disbursement Fee on the Private Loan. PK/50 | DOL-001 | PK/50   \| 0 |
| Preview 029 MBA LOANS AY05-06 Brochures Branded for Sallie Mae Ed Trust. Standard Pricing Tier. Zero Disbursement Fee on the Private Loan. PK/50 | SMT-029 | PK/50   \| 0 |
| Preview 030 MBA LOANS AY05-06 Brochures Branded for Sallie Mae Ed Trust. Premier Pricing Tier. Zero Fees on the Private Loan. PK/50 | SMT-030 | PK/50   \| 0 |
| Preview Brochures | AMS-013 | PK/50   \| 0 |
| Preview Career Training and Information Technology Loans Brochures / Standard Rates (rev 6/04) | SLM-003 | PK/50   \| 0 |
| n/a Community College Solutions Brochure | FAA-011 | PK/25   \| 0 |
| Preview Dollar Bank version of the MBA LOANS AY05-06 Brochures. Premier Pricing Tier. Zero Origination Fee on the Stafford Loan and Zero Fees on the Private Loan. PK/50 | DOL-002 | PK/50   \| 0 |
| n/a Entrance/Exit Interview Form Branded for Sallie MaeEducation Trust/Lender Code | SLM-005 | PK/100  \| 0 |

| 80221 | | | |
|---|---|---|---|
| Preview Entrance/Exit Interview Forms | AMS-019 | PK/100 | 0 |
| Preview First Aid Kit | AMS-001 | EA | 0 |
| Preview K-12 Family Education Loan Buckslip. 4-color buckslip promoting the SLM Financial Loan for private school tuition and education related expenses. PK/100 | BOR-124 | PK/100 | 0 |
| Preview K-12 Family Education Loan Program Brochures | SMT-001 | PK/50 | 0 |
| Preview K-12 Family Education Loan Program Brochures with Application | SLM-018 | PK/50 | 0 |
| Preview LAWLOANS Bar Study Loan Applications for AY05-06. Pre-printed with The First National Bank in Sioux Falls referred by Sallie Mae Education Trust as lender. Lender Code 500500-0500. PK/50 | SMT-033 | PK/50 | 0 |

PRODUCT SEARCH RESULTS: 53 PRODUCTS

| [1] | 2 | 3 | 4 | >>>

[ Back ]

help | terms of use | privacy policy | contact us

*FIG. 41* (con't)

cart | view saved orders(2) | my profile | help | sign out

[ home ] [ place order ] [ order status ] [ library ] [ create content ]

Place order  Compose cover letter

1| Select Category
   o Custom Sales Kits!

Choose the school you wish to order for by completing the information below. Click c in the text boxes on this page.

2| Choose School /
   Event / Myself

\* Required

To:    Ms. Sarah Smith
       Address

3| Compose Cover Letter

\*Greeting:    [Dear Ms. Smith       ]

4| Select Lits Items

\*Body:
[Body of letter.

]

5| Collate Kit Items

6| Order Checkout

7| Confirm Order

407

\*Closing:    [Sincerely,       ]

Signature:    Mr. Eric Jones
             Address

Currently, you do not have a digital signature on

[ Back ]  [ S help | terms of use | privacy policy | contact us

*FIG. 4J*

SallieMae cart | view saved orders(2) | my profile | help | sign out

[ home ] [ place order ] [ order status ] [ library ] [ create content ]

Place order

1| Select Category
  o Custom Sales Kits

2| Choose School /
  Event / Myself

3| Compose Cover Letter

4| Select Kit Items

5| Collate Kit Items

6| Order Checkout

7| Confirm Order

408

Search inserts

Find the insert(s) you would like to order by choosing one of the following options:

View product sell sheets:

Search by keyword:
Type in keywords:

Select a insert type:
Select a insert type: [ Ent-Exit Counseling ▼ ]

Select by audience:
Select an audience: [ All audiences ▼ ]

Search by item number:
Enter your items numbers (separate multiple items with a comma).

View all inserts

Ba
Sa
Canc help | terms of use | privacy policy | contact us

*FIG. 4K*

SallieMae cart | view saved orders(2) | my profile | help | sign out

| home | place order | order status | library | create content |

Place order

1| Select Category
   o Custom Sales Kits

2| Choose School /
   Event / Myself

3| Compose Cover Letter

4| Select Kit Items

5| Collate Kit Items

6| Order Checkout

7| Confirm Order

Sales kit insert collation

Please confirm the collation sequence for your sales kit. The items will be placed in a business card.

| SALES KIT - Collation Requirements | | | |
|---|---|---|---|
| PREVIEW | PRODUCT NAME / DESCRIPTION | ITEM # | COLLATIO SEQUENCI |
| Preview | Cover Letter printed on Sales Kit Letterhead | FAA-099 | R1 ☐ |
| Preview | LAWLOANS/3 Savings Option, Zero Origination Fees PK/20 (This item is specifically for custom sales kits, sales calls and conferences. NOT for distribution to Borrowers. A maximum of 5 packs will be sent). | SEL-062 | R2 ☐ |

Back

409 help | terms of use | privacy policy | contact us

*FIG. 4L*

cart | view saved orders(2) | my profile | help | sign out

[ home ] [ place order ] [ order status ] [ library ] [ create content ]

Place order

1] Select Category
   o General Collateral

2] Choose School /
   Event / Myself

3] Choose Product

4] Order Checkout

5] Confirm Order

410

Order checkout: shipping information.

To complete the order process, you must provide shipping instructions. If necessary edit your order by clicking on return to cart.

*\* Required*

Date:     05/10/2005

[ Add new ]     [ Contact ]

Ship to:     Ms. Sarah Smith edit
             Address

*Delivery needed by:    [05/19/2005]
*Shipping method will be determined by the date you in materials need to arrive at the school/event.*

Special instructions(optional):

[                                              ]

[ Return to cart ]    [ Confirm o
                                                    Sav
                                                      Canc help | terms of use | privacy policy | contact us

*FIG. 4M*

Welcome to the Digital Gateway

SallieMae
Nobody gives you more support.

items in cart: (0) | your profile | help | sign out

[ home ] [ place order ] [ check status ] [ library ]

Choose Template
Step 1: Choose your template design for both print and web

1. Print (PDF)

| Logo | School Address |
|------|----------------|
|      | Welcome Greeting |
|      | Optional Graphic |

Text choose

2. Web (HTML)

| Logo | School Address |
|------|----------------|
| Navigation | |
| Optional Graphic | Text | choose

[ CREATE CONTENT ]

terms of use | privacy policy | report a problem

SallieMae cart | view saved orders(1) | my profile | help | sign out home | place order | order status | library

Viewing orders is easy

Simply choose the category you would like to view.

Order Status

Click one of the categories below to view your order by status.

All orders 

All orders allows you to view all of the orders that are saved, pending and completed

Completed orders 

Completed orders allows you to view all of the orders that are completed

Pending orders 

Pending orders allows you to view all of the orders that are pending.

Saved orders 

Saved orders allows you to view all of the orders that are saved.

415 help | terms of use | privacy policy | contact us

*FIG. 4R*

SallieMae cart | view saved orders(1) | my profile | help | sign out

[ home ] [ place order ] [ order status ] [ library ]

All orders

| ALL ORDERS | | | | |
|---|---|---|---|---|
| DATE | SCHOOL/EVENT | ORDER # | STATUS | DETAIL |
| 05/10/2005 | Socrates State University | 5062051005N | Cancelled | Detail |
| 05/10/2005 | Socrates State University | 5063051005N | Cancelled | Detail |
| 05/10/2005 | Sallie Mae, Inc. | 5064051005N | Cancelled | Detail |
| 05/10/2005 | Sallie Mae, Inc. | 5067051005N | Saved | Detail |
| 05/10/2005 | Socrates State University | 5068051005N | Cancelled | Detail |
| 05/15/2005 | Socrates State University | 5249051505N | Cancelled | Detail |

416 help | terms of use | privacy policy | contact us

*FIG. 4S*

Standard Reports:

| Report Name | Status |
| --- | --- |
| Pending Report (admin only) | In Development<br>Pending Rep Approval<br>Pending School Approval<br>Pending SLMA Approval |
| Web Publishing Report (admin only) | Testing<br>Pending P.O.<br>Pending Payment<br>Live |
| Print Fulfillment Report (admin only) | Printing<br><br>Shipping<br><br>Received |
| Completed Jobs Report (admin only) | Completed |
| Archived Jobs Report (admin only) | Archived |
| Management Report (admin & sales managers) | |

*FIG. 5*

METHOD AND APPARATUS FOR CREATING PRINTED DOCUMENTS AND INTERNET WEB PAGES

CROSS-REFERENCE TO RELATED APPLICATIONS

This patent application claims the benefit of U.S. provisional patent application Ser. No. 60/585,926, filed Jul. 8, 2004, entitled "METHOD AND APPARATUS FOR THE SIMULTANEOUS CREATION OF PRINTED DOCUMENTS AND XHTML/HTML INTERNET WEB." U.S. provisional patent application Ser. No. 60/585,926 is hereby incorporated by reference.

FIELD OF THE INVENTION

The present invention relates generally to a method and system and computer program for Internet World Wide Web-based services, and more specifically to a system and method for creating and transforming digital documents into formats acceptable for printing and display on devices used for viewing Internet Web pages.

BACKGROUND OF THE INVENTION

With the advent of the Internet, more and more businesses in a wide range of industries have been adopting new technologies for improved distribution of information contained in traditionally printed documents onto Web pages can that be viewed through the Internet using devices that can retrieve and view this information in a digital format. These technological advances have increased productivity and efficiency so that faster distribution of information, greater efficiency, greater effectiveness, and more customized solutions are becoming the expected norm for communicating information in a digital form. The increase in customized and personalized distribution of information has also had a positive impact on business-to-business transactions, as companies, individuals and other entities, including educational and financial institutions, are working together more to create customized solution to tailored to a customer's needs.

Educational institutions and financial institutions have adopted technologies to improve the dissemination of financial aid information to consumers, such as students, potential students, and their families. For example, both educational and financial institutions may offer information about financing a college or graduate education in both printed documents and digital Internet Web pages. Educational and financial institutions have traditionally created printed "brochures" containing this information and distributed these documents manually to interested customers.

For example, the institution may create a printed document that contains information about how a student can apply for a Stafford student loan. The document may contain information that has been specifically customized for a particular institution. The printed document may contain colors, images, and contact information specific to that institution. Traditionally, printed documents have been created using an iterative process where several drafts of the document are communicated between the customer institution(s), a print design company, and a print production company. On occasion, the print design company and the print production company are the same company. The "drafts" of the document have traditionally been communicated to each party manually, using a fax machine, or postal mail and any requested changes to the document manually marked on the "draft" printed document. Once the contents of the document have been modified to the agreement of all parties, a final proof of the document is created by the print design firm using any number of proprietary document design and print software products. The final document proof is then sent to the printer for production printing of the document.

More recently, a new technological process has emerged to eliminate the need to communicate drafts of printed documents manually, via fax, or postal mail. Many companies have begun to offer a service known as "Web-to-print" for printed document creation and review. This process will typically utilize a digital document format from Adobe Corporation known as "PDF." The PDF digital document can be constructed to represent a very close facsimile to an equivalent printed document.

The most common "Web-to-print" document creation process requires the creation of a digital document created in PDF format. The PDF file is communicated via the Internet between the customer, the print design firm, and the print production company as an email attachment. The document is then opened and viewed using Adobe's freely distributed PDF viewer allowing the reader of the document to electronically note and communicate desired changes to the document. Once the digital PDF is ready for printing, the file is sent directly to the print device for production printing of the document. This process has become popular as it significantly reduces the time required to distribute and approve "draft" variations of the document prior to authorizing sending a document to a printing device for production printing of documents.

As the Internet has matured and has become readily accessible to many, industries, including education and financial institutions, have created Internet Web pages that are used to communicate the same information that is contained in printed documents. Today the process for creating these Web pages utilizes a different set of technologies, skills, and systems to build them. An institution will typically contract with a company that employs people that know how to build and deploy Internet Web systems and pages. The institution will work with the Web page design and development company to create Web pages that will communicate the information that the institution desires to be communicated to its customers that visit the institution's Web site. The company that designs and develops the printed documents is rarely the same company that will build the Internet Web pages. As a consequence of this technology divergence, institutions must now use two very different processes for creating their printed documents and their Web pages, which often contain the same or similar information.

An observation could be made that the print production industry considers the use of Internet Web pages as a threat to its industry as it will over time reduce the need to distribute information utilizing printed documents. In a similar fashion, the Internet Web page development companies and technology development firms believe that the production of printed documents is a dying industry and therefore these companies have no desire to offer products, services, or technologies that aid the production of printed documents.

Thus, there is a need for an online suite of easy-to-use tools to help automate the cumbersome process of ordering, customizing and printing materials, both for the creation of printed documents and Web-based versions of the same documents.

BRIEF SUMMARY OF THE INVENTION

The invention provides a system and method which allow users to create and view, using an Internet Web page capable viewing device, a digital document that can be sent directly to a print device for production printing, and a Web page that contains the same information contained in the digital document that will be printed.

The system comprises a computer network, at least one client computer in communication with the computer network that can view Web pages, a network attached computing device capable of hosting a computer application, a network attached device capable of storing and managing digital documents and digital document assets, and at least one connection to the Internet. The system uses an application program to provide a guided experience for helping the user simultaneously create a digital representation of a document that will be printed as a hard copy document and a Web page that can be viewed on an Internet-attached Web page viewing device. The digital document transformation system can simultaneously create a variety of Web pages and digital document formats that can be viewed using any device capable of attaching to the Internet and that has the capability of displaying the digital document file format.

BRIEF DESCRIPTION OF THE DRAWINGS

Additional features of the present invention will be apparent from the following detailed description and drawings which illustrate exemplary embodiments of the invention.

FIG. 4B is a computer monitor screen view of the homepage of the Web Site of FIG. 2;

FIG. 4C is a computer monitor screen view of the place order portion of the Web Site of FIG. 2;

FIG. 4D-4G are computer monitor screen views depicting the general collateral ordering portion of the Web Site of FIG. 2;

FIG. 4H-4I are computer monitor screen views of the library portion of the Web Site of FIG. 2;

FIG. 4J-4M are computer monitor screen views of the custom sales kit ordering portion of the Web Site of FIG. 2;

FIGS. 4N-4Q are a computer monitor screen view of the custom print documents and Web pages ordering portion of the Web Site of FIG. 2;

FIGS. 4R-4S are a computer monitor screen view of the order status portion of the document transformation system; and FIG. 5 is a chart showing the reporting options available to the different user status from FIG. 2.

DETAILED DESCRIPTION OF THE INVENTION

In the following detailed description, reference is made to the accompanying drawings, which form a part hereof and show by way of illustration specific embodiments that the invention may be practiced. These embodiments are described in sufficient detail to enable those skilled in the art to practice the invention, and it is to be understood that other embodiments may be utilized, and that structural and logical changes may be made without departing from the spirit and scope of the present invention. The progression of process steps described is exemplary of embodiments of the invention; however, the sequence of steps is not limited to that set forth herein and may be changed, with the exception of steps necessarily occurring in a certain order.

The present invention is for a computer system, method and computer-program product which allow users to simultaneously create and view, using an Internet Web page capable viewing device, a digital document that can be sent directly to a print device for production printing and a Web page that contains the same information contained in the digital document that will be printed.

Figure 1:
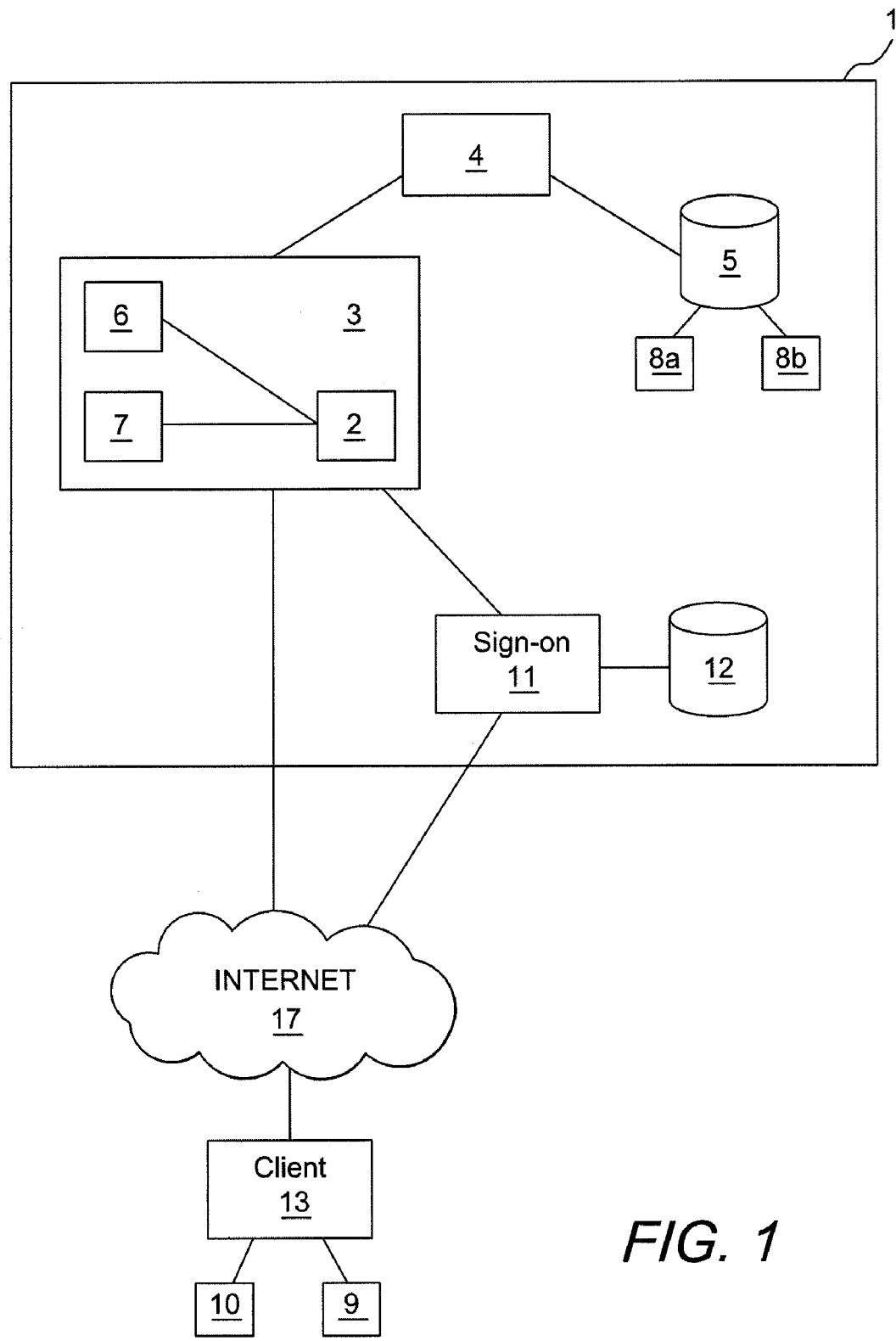
FIG. 1 is an overview of the system according to a preferred embodiment of the present invention.

As illustrated in FIG. 1, the digital document transformation system 1 comprises a computer network 4, a network-attached computing device 3 capable of hosting a computer application (e.g., a server), a network-attached device 5 capable of storing and managing digital documents 8a and digital document assets 8b (e.g., a database), and at least one connection to the Internet 17. The digital document transformation system 1 includes a Web Site 2 that provides a guided experience by which the users 9, 10 can create a digital representation of a digital document that will be printed as a hard copy document and/or a Web page that can be viewed on an Internet-attached Web page viewing device. The digital document transformation system 1 can simultaneously create a variety of Web pages and digital document formats that can be viewed using any device capable of attaching to the Internet 17 and that has the capability of displaying the digital document file format.

The Web Site 2 is accessible from outside of the digital document transformation system 1 by way of a client computer 13 with access to the Internet 17. The Web Site 2 provides access to the users 9, 10 to the document creation and editing module 6 and the kit creation module 7, which are described in more detail below. In the illustrated embodiment, user 9 can be, for example, a sales representative from a lending institution or a representative from a school financial aid office. User 10 is an administrative user, who manages the system 1. Optionally, user 10 can have direct access to the computer network 4 and need not access the system 1 via the Internet.

Users 9, 10 sign-on to the digital document transformation system 1 through the sign-on module 11, which is in communication with the digital document transformation system 1. The sign-on module 11 allows user 9, 10 access to the system 1 only after a valid sign-in and until the user 9, 10 logs out of the digital document transformation system 1. The sign-on module 11 additionally comprises at least one database or other known storage unit 12 for storing data associated with the users 9, 10, and is configured to update the data associated with the users 9, 10 and store the updated data in the database 12. Further, the sign-on module allows the system 1 to recognize the user 9, 10 type. The system 1 then configures the available content based on that user type as described in more detail below.

Figure 2:
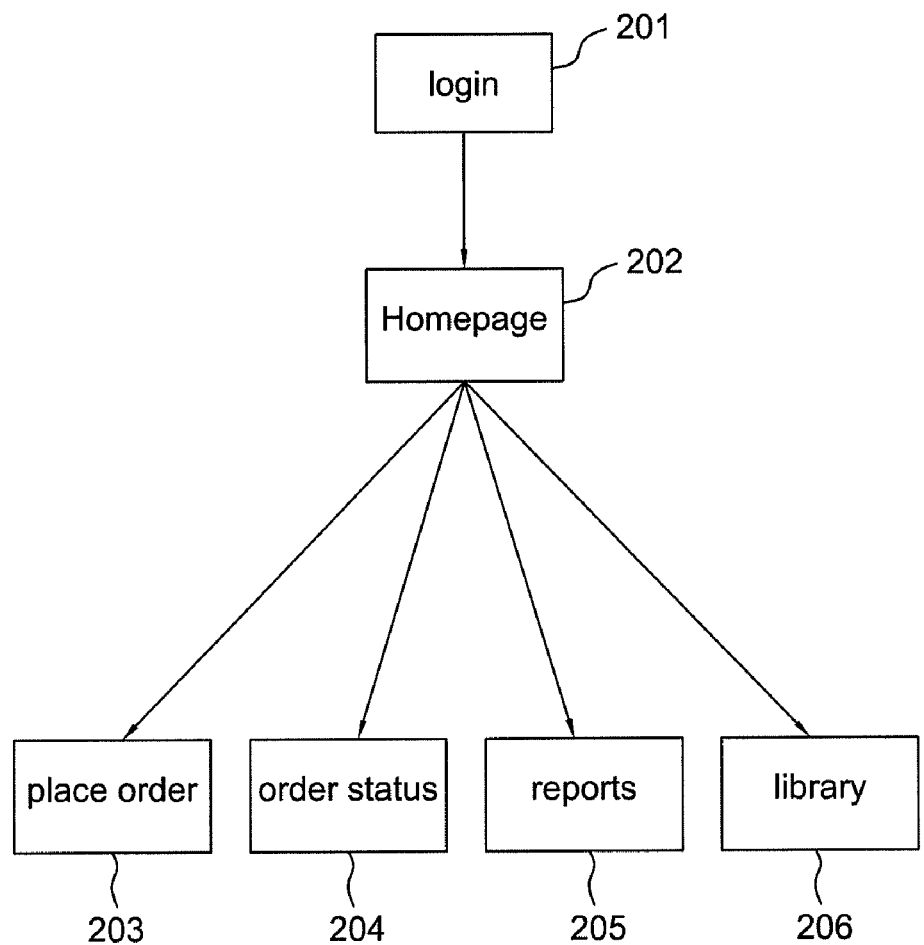
FIG. 2 is an structure for a Web Site according to an exemplary embodiment of the present invention.
Figure 4A:
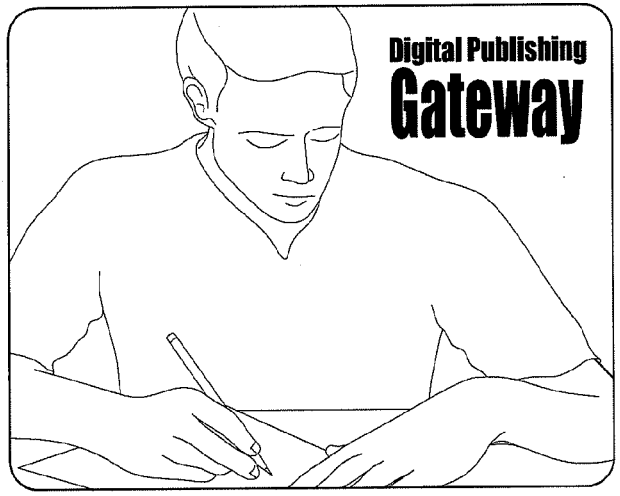
FIG. 4A is computer monitor screen view of the login Web page of the Web Site of FIG. 2.

FIG. 2 depicts an exemplary structure for the Web Site 2 of the present invention. The user 9, 10 will first see the log-in screen 201. A screen shot of the log-in screen 201 is shown in FIG. 4A. On the log-in screen 201, the user will enter a username (email address) and a masked password. If the user 9, 10 forgets his/her password, he/she will be asked a challenge question, to which they are provided the answer when registering with the site. Separate log-in pages and URLs are available for different users (i.e. for different lending institutions and schools using the application) if desired. Once logged in to the system, the user will be taken to the homepage 202. A screen shot of the homepage 202 can be seen in FIG. 4B. The homepage includes content in the left-hand navigation which is reserved for second level navigation beyond the homepage. Upon entering the site, users 9 will be provided a summary of their pending and completed orders, as well as any outstanding saved-in-progress orders, as shown in FIG. 4B. Administrative users 10 can be presented with different information, for example, a summary of all pending orders in the system 1.

The navigational options available from the homepage include place order 203, order status 204, reports 205, and library 206. Other navigational options, such as a log-out option, can be included as desired. Not all navigation options will be available to all users 9, 10 of the application. Only the available options will be shown to any given user 9, 10. The available options are based upon the status of the user, e.g. sales representative 9, school representative 9, or administrator 10.

FIG. 4C is a screen shot of the place order page 203. From the place order page 203, users 9 can order general collateral, which are general pre-defined informational materials. For example, a school representative user 9 could place an order for printed brochures regarding a variety of student loan types to be distributed to students through the school financial aid office. FIGS. 4D-4I and 4M show the general collateral order pages 401 through 407 and 410 of the Web Site 2.

As shown in FIG. 4D, the user 9 selects the entity he/she wishes to place an order for on page 401. In the illustrated example, the user 9 chooses to place an order for a school, so on page 403 (FIG. 4E), the user 9 can search for the desired school and select that school from among the search results on page 402 (FIG. 4F). The user then verifies the school information at page 404 (FIG. 4G).

To select a product to order, the user 9 is directed to the "library" 206 portion of the Web Site 2 (FIG. 2). The library 206 can contain documents that are available for order, as well as documents that are for exemplary purposes only and not available for order. Users 9 can also browse the library 206 directly from the homepage 202 (FIG. 4B).

Upon entering the library 206 portion of the Web Site 2, the user 9 is presented with a search page 405 (FIG. 4H). Once the user 9 enters search criteria, the user 9 is presented with the list of materials meeting the search criteria on a library search results page 406 (FIG. 4I). From the results page 406, the user 9 can preview the documents and select documents to order.

Once the user 9 has chosen products to order, the user is directed to the order checkout page 410 (FIG. 4M). At page 410, the user 9 enters or confirms shipping information.

Users 9 can also place an order for a custom sales kit using the kit creation module 7. The kit creation module 7 is a computer program application running on the network-attached computing device 3 and gives users 9 the ability to create a sales kit for a desired recipient. The user 9 can create a kit including: a customized cover letter, pre-defined informational materials arranged in a desired order and a business card. The kits can then be sent by the administrative entity directly to the desired recipient. In this manner the user 9, for example, a sales representative from a lending institution, can easily and conveniently follow up with sales, e.g. the sales representative chooses the product sell sheets and other materials needed to complete the follow up kit and the packet of materials is generated to send to a school.

FIGS. 4J-4M are screen shots of the custom sales kit ordering pages 407, 408, 409, 410 of the Web Site 2. Page 407 (FIG. 4J) allows the user 9 to create a cover letter for the kit. On page 408 (FIG. 4K), the user selects the information items that will be included in the kit. In the illustrated example, the user 9 can search all available items and choose from among the search results. The user 9 is then able to determine the order that the selected items will appear in the kit via page 409 (FIG. 4L). At the check out page 410 (FIG. 4M), the user 9 can enter the shipping information for the kit and confirm the order.

Optionally, the module 7 allows a user 9 to save an order to the network-attached device 5 at any time during the ordering process. When a user 9 saves an order it is shown as a pending order.

FIGS. 4N-4Q illustrate the custom print documents and Web pages place order pages 411, 412, 413, 414 of the Web Site 2. Creation of the print documents and Web pages is supported by the document creation and editing module 6, which is a computer program application running on the network-attached computing device 3.

Upon selecting the custom print documents and Web pages place order option, the user 9 is presented with page 411 (FIG. 4N) where the user can select the templates for the print document and Web page to be created. Any variety of templates can be made available to the user 9, as desired. Exemplary Web page templates include, among other things, welcome pages, and transition pages. After the user has selected the templates, the user chooses to create the content for the print document and Web page via page 412 (FIG. 4O). In the illustrated embodiment, the user 9 can enter information about a school, images, a greeting and text. Other options can be made available depending on the selected template and as desired. The information entered by the user 9 are stored on the network-attached device 5 as the digital documents 8b.

Figure 4P:
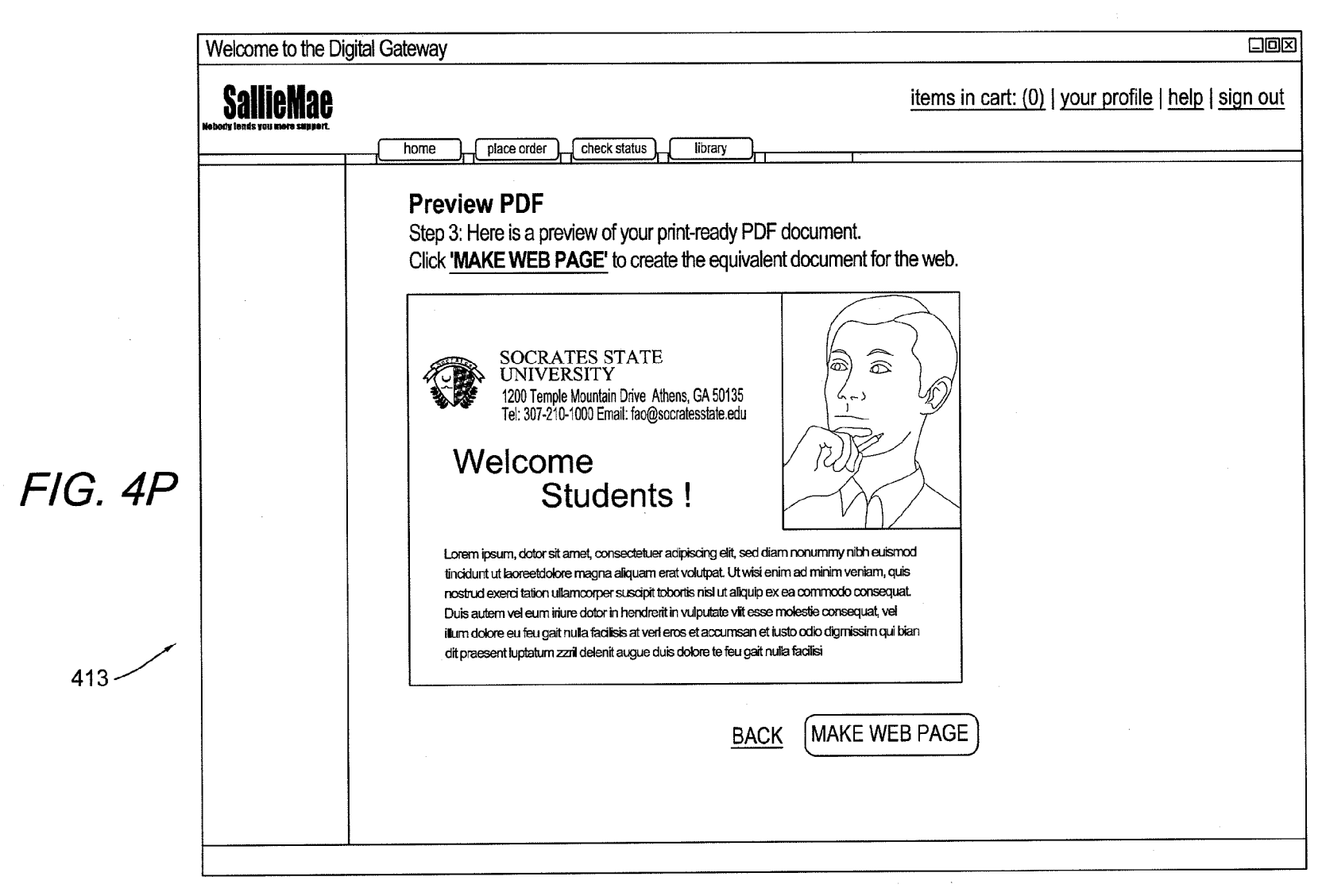
Figure 4Q:
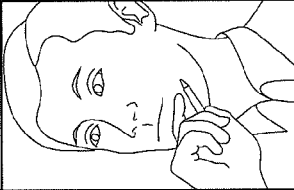

Once the user 9 has created the content, the user can preview the printed document as a PDF file at page 413, as shown in FIG. 4P. Likewise, the user can preview the Web page containing the same information at page 414, as shown in FIG. 4Q. Thus, the user 9 can create print and Web documents containing the same information conveniently and simultaneously. These documents are on the network-attached device 5 as the digital document assets 8a.

Optionally, the module 6 allows a user 9 to save an order to the network-attached device 5 at any time during the ordering process. When a user 9 saves an order it is shown as a pending order.

In the illustrated embodiment, it can be desirable to coordinate the involvement of more than one type of user. For example, when a sales representative 9 places an order using print documents and Web pages place order portion of the Web Site 2 on behalf of a school, it is desirable to allow the school's representative 9 to preview and modify the order before it is printed or published on the Web to ensure that the school is satisfied. For this, the invention provides an approval process.

Figure 3:
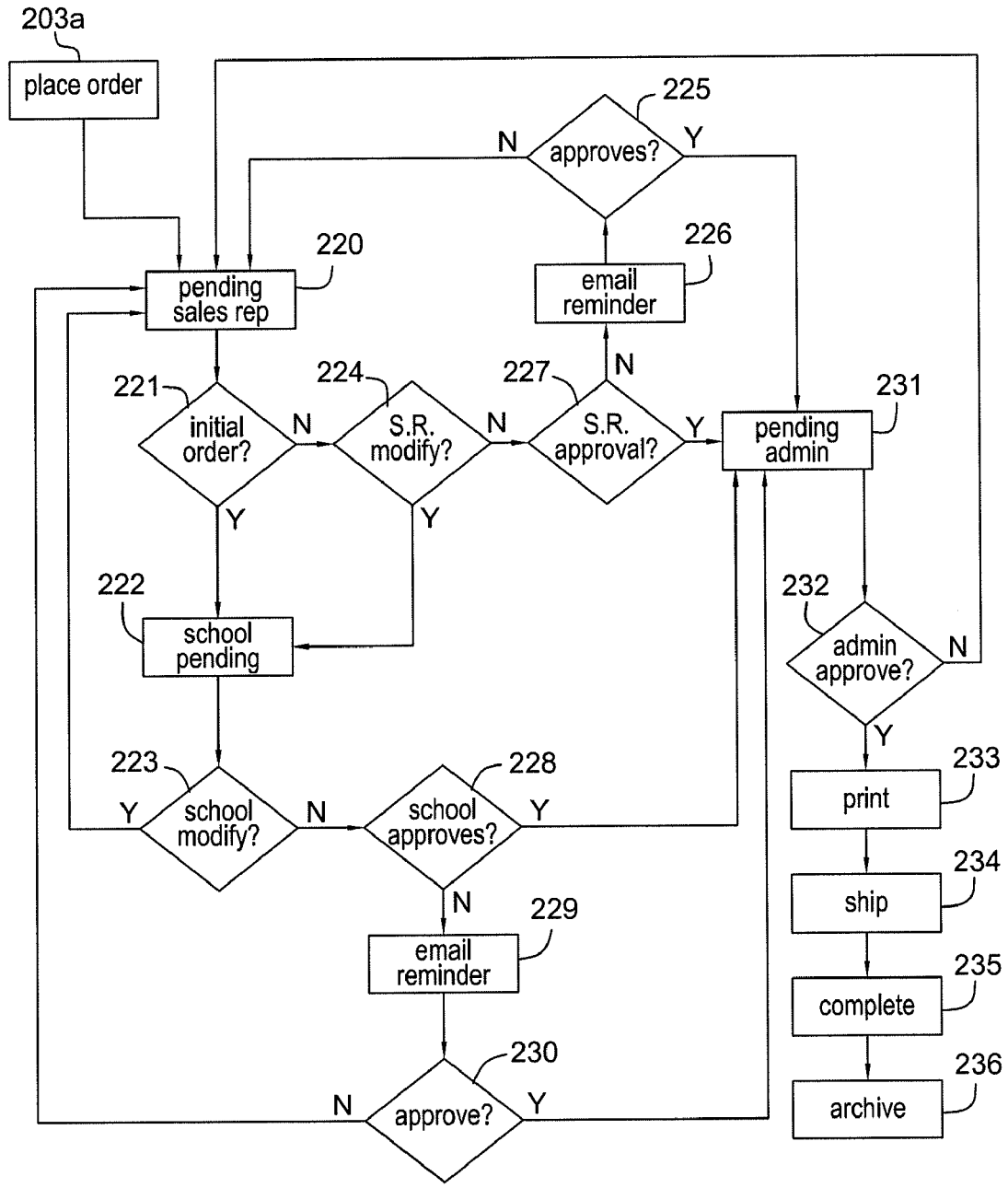
FIG. 3 is a flow chart depicting the approval process for a customized print document and/or Web page order.

FIG. 3 illustrates the approval process for a print and/or Web order. The approval process is supported by the document creation and editing module 6. The approval process is described in connection with an order placed by a lending institution sales representative 9. It should be understood that a school representative 9 could also initiate an order.

Since the sales representative 9 placed the order, the first status is "Pending—Sales Representative" 220. Once the order is complete, at step 221, the status changes to "Pending—School" 222 at which point the school representative 9 can either modify 223 or approve 228 the order. If the school representative 9 modifies the order at step 223, then the status returns to "Pending—Sales Representative" 220 where the sales representative 9 can either modify 224 or approve 227 the order as well since the sales representative 9 will be considering a modified order, rather than an initial order. If the sales representative 9 has modified the order at step 224, it would go back to "Pending—School" 222, and repeat the process from there.

If the sales representative 9 has not modified the order at step 224, and the sales representative 9 approves the order at step 227, the status changes to "Pending—Administrator" 231. If the sales representative has not approved the order at step 227, an email reminder 226 is sent to the sales representative 9 at predetermined intervals until approval at step 225. If there is no approval at step 225, the status remains as "Pending—Sales Representative" 220. If there is approval at step 225, the status changes to "Pending—Administrator" at step 231.

Referring back to step 223, when the school representative 9 does not modify the order and instead approves the order at step 228, then the status changes to "Pending-Administrator" 231. If the school representative 9 does not approve the order at step 228, an email reminder 229 is sent and if no approval is received within a set time frame, the order status returns to "Pending—Sales Representative" 220. If there is approval at step 230, the status changes to "Pending—Administrator" 231.

From the "Pending—Administrator" 231 status, if the administrator 10 does not approve the order at step 232, the status returns to "Pending—Sales Representative" 220, and the process continues from there. If the administrator 10 does approve the order at step 232, the order continues through the rest of the order approval process which includes the steps of print 233, ship 234, complete 235 and archive 236. The approval process for a Web order is similar, where the "Pending" statuses of the print process correspond with the "In-Development" statuses of the Web process.

The functions available on the "order status" 204 portion of FIG. 2 include, but are not limited to, a list of the incomplete or saved items that is searchable by order status, searchable order history, and the option to duplicate a previous order from the order history. Screenshots of the "Order Status" pages 415 and 416 are shown in FIGS. 4R and 4S. There are several options for the status of an order as it works its way through the approval process. For a print order, the order status options are pending—sales representative, pending—school, pending—administrator, printing, shipping, completed, and archived. For a Web order, the order status options are in-development—sales representative, in-development—school, in-development—administrator, testing, live, and archived. The variations in the "pending" and "in-development" statuses are based on the rights of the given user.

FIG. 5 illustrates the "reports" 205 portion of the Web Site 2 shown in FIG. 2. The chart shows the reports which are available in a preferred embodiment of the invention and the status of the users 9, 10 who can view the given reports. Other reports may also be included in the reports section beyond those illustrated in FIG. 3C, if desired. In addition to the reports, tools are also available in the reports/tools section 205. Tools available include modifying passwords (all users 9, 10), adding/modifying schools (school representatives 9 and administrators 10), creating new users (administrators 10), changing static templates (administrators 10), and email reports.

The processes and devices described above illustrate preferred methods and typical devices of many that could be used and produced. The above description and drawings illustrate exemplary embodiments, which achieve the objects, features, and advantages of the present invention. It is not intended, however, that the present invention be strictly limited to the above-described and illustrated embodiments. Any modifications of the present invention that come within the spirit and scope of the following claims should be considered part of the present invention.

What is claimed as new and desired to be protected by Letters Patent of the United States is:

1. A digital document transformation system, comprising:
   a computer network;
   a network-attached computing device comprising:
      a document creation and editing module for simultaneously creating a print document that can be sent directly to a print device for printing and a Web page that can be published to a Web site; and
      a Web site providing a user interface to the document creation and editing module, wherein the user interface facilitates selection of a print document template and a Web page template from a plurality of document templates and input of content information for simultaneously completing the selected print document and Web page templates such that the document creation and editing module simultaneously creates the print document and the Web page with the same content information; and
   a first storage device connected to the computer network for storing the content information, the print document, and the Web page; and a sign-on module connected to the computer network for controlling access to the document creation and editing module, wherein the sign-on module allows the system to recognize an identity of a user and customize the Web site according to provide the user identity.

2. The system of claim 1, wherein the document creation and editing module is configured to allow different users to preview, modify, and approve the content information for the printed document and the page.

3. The system of claim 2, wherein the document creation and editing module is further configured to notify at least one of the different users when the printed document and the associated Web page are ready for approval.

4. The system of claim 1, further comprising a kit creation module for creating a custom sales kit comprising a cover letter and pre-defined documents arranged in a user-defined order.

5. The system of claim 4, wherein the user interface allows a user to select the user-defined order that the pre-defined documents will appear within the custom sales kit.

6. The system of claim 4, wherein the user interface allows a user to input shipping information to designate a recipient of the custom sales kit.

7. The system of claim 1, wherein the plurality of document templates includes a plurality of print document templates and a plurality of Web page templates, and the selected print document template is different from the selected Web page template.

8. A digital document transformation system, comprising:
   a computer network;
   a network-attached computing device comprising:
      a document creation and editing module for simultaneously creating a print document that can be sent directly to a print device for printing and a Web page that can be published to a Web site;

a kit creation module for creating a custom sales kit, wherein the custom sales kit includes a cover letter and pre-defined documents arranged in a user-defined order; and a Web site providing a user interface to the document creation and editing module and the kit creation module, wherein the user interface facilitates selection of a print document template from a plurality of print document templates and a Web page template from a plurality of Web page templates and input of content information for simultaneously completing the selected print document and Web page templates such that the document creation and editing module simultaneously creates the print document and the Web page with the same content information;

a first storage device connected to the computer network for storing information associated with the document creation and editing module and the kit creation module;

a sign-on module connected to the computer network for controlling user access to the digital document transformation system; and a second storage device connected to the computer network for storing user information.

9. The system of claim 8, wherein the document creation and editing module is configured to allow different users to preview, modify, and approve the content information for the printed document and the associated Web page.

10. The system of claim 9, wherein the document creation and editing module is further configured to notify at least one of the different users when the printed document and the associated Web page are ready for approval.

11. The system of claim 10, wherein the document creation and editing module is further configured to send a reminder notification to the at least one of the different users at predetermined intervals until the printed document and the associated Web page are approved.

12. The system of claim 8, wherein the user interface allows a user to select the user-defined order that the pre-defined documents will appear within the custom sales kit.

13. The system of claim 8, wherein the user interface allows a user to input shipping information to designate a recipient of the custom sales kit.

14. A computer readable medium encoded with a document creation and editing program for causing a computer in communication with a computer network and a storage device to execute the steps of:

providing an interface for placing an order, the interface facilitating selection of a print format template and a Web page format template from among a plurality of document templates and input of content information that can be used to simultaneously create a print document according to the selected print format template and a Web page that can be published to a Web site according to the selected Web page format template such that the simultaneously created print document and Web page contain the same content information;

storing the content information, the print document, and the Web page in the storage device; and displaying the print document and the Web page on the interface; Wherein the interface further allows for different parties to preview, modify, and approve the content information for simultaneously creating the print document and the Web page.

15. The computer readable medium of claim 14, wherein the selected print format template is different from the selected Web page format template.

16. The computer readable medium of claim 14, wherein the interface further allows for the creation of a custom sales kit comprising a cover letter and pre-defined documents arranged in a user-defined order.

17. The computer readable medium of claim 16, wherein the interface further allows a user to select the user-defined order that the pre-defined documents will appear within the custom sales kit.

18. The computer readable medium of claim 16, wherein the interface further allows the user to input shipping information to designate a recipient of the custom sales kit.

19. The computer readable medium of claim 14, further comprising the step of storing the order and a status of the order in the storage device.

* * * * *

UNITED STATES PATENT AND TRADEMARK OFFICE
CERTIFICATE OF CORRECTION

PATENT NO. : 7,605,942 B2  Page 1 of 1
APPLICATION NO. : 11/172919
DATED : October 20, 2009
INVENTOR(S) : Bush et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Fifth Day of October, 2010

David J. Kappos
*Director of the United States Patent and Trademark Office*